(12) United States Patent
Smith et al.

(10) Patent No.: US 6,932,116 B2
(45) Date of Patent: Aug. 23, 2005

(54) FIBER REINFORCED COMPOSITE LINER FOR LINING AN EXISTING CONDUIT AND METHOD OF MANUFACTURE

(75) Inventors: E. Peter Smith, Ravensthorpe (GB); David Hahn, Wildwood, MO (US); John Ernest Gumbel, Winchester (GB)

(73) Assignee: Insituform (Netherlands) B.V., Rotterdam (NL)

( * ) Notice: Subject to any disclaimer, the term of this patent is extended or adjusted under 35 U.S.C. 154(b) by 0 days.

(21) Appl. No.: 10/806,944

(22) Filed: Mar. 23, 2004

(65) Prior Publication Data
US 2005/0028881 A1 Feb. 10, 2005

Related U.S. Application Data

(63) Continuation-in-part of application No. 10/098,972, filed on Mar. 14, 2002, now Pat. No. 6,708,729.

(51) Int. Cl.$^7$ ................................................. F16L 9/14
(52) U.S. Cl. .................. 138/98; 138/97; 138/124; 138/125; 405/150.1; 264/269; 156/287
(58) Field of Search ........................... 138/98, 97, 124, 138/125–127; 264/269, 270; 156/287; 405/150.1

(56) References Cited

U.S. PATENT DOCUMENTS

| | | | | |
|---|---|---|---|---|
| 1,722,764 A | * | 7/1929 | Rasch | 442/240 |
| 2,424,315 A | * | 7/1947 | Hyatt et al. | 138/128 |
| 4,009,063 A | * | 2/1977 | Wood | 156/71 |
| 4,135,958 A | * | 1/1979 | Wood | 156/199 |
| 4,366,012 A | * | 12/1982 | Wood | 156/93 |
| 4,390,574 A | * | 6/1983 | Wood | 428/34.1 |
| 4,446,181 A | * | 5/1984 | Wood | 428/36.1 |
| 4,478,661 A | * | 10/1984 | Lewis | 156/92 |
| 4,576,205 A | * | 3/1986 | Morinaga et al. | 138/98 |
| 4,622,196 A | * | 11/1986 | Wood | 264/229 |
| 4,758,454 A | * | 7/1988 | Wood | 428/36.4 |
| 4,836,715 A | * | 6/1989 | Wood | 405/150.1 |
| 4,851,274 A | * | 7/1989 | D'Elia | 428/113 |
| 4,976,290 A | * | 12/1990 | Gelin et al. | 138/141 |
| 5,010,440 A | * | 4/1991 | Endo | 361/215 |
| 5,077,107 A | * | 12/1991 | Kaneda et al. | 428/36.1 |
| 5,186,987 A | * | 2/1993 | Imoto et al. | 428/34.5 |
| 5,271,433 A | * | 12/1993 | Schwert et al. | 138/98 |
| 5,280,811 A | * | 1/1994 | Catallo et al. | 138/98 |
| 5,285,741 A | * | 2/1994 | Askin | 112/475.08 |
| 5,305,798 A | * | 4/1994 | Driver | 138/98 |
| 5,411,060 A | * | 5/1995 | Chandler | 138/98 |
| 5,501,248 A | * | 3/1996 | Kiest, Jr. | 138/98 |
| 5,634,743 A | * | 6/1997 | Chandler | 405/150.1 |
| 5,680,885 A | * | 10/1997 | Catallo | 138/98 |
| 5,868,169 A | * | 2/1999 | Catallo | 138/98 |
| 5,931,199 A | * | 8/1999 | Kittson et al. | 138/98 |
| 6,170,531 B1 | * | 1/2001 | Jung et al. | 138/98 |
| 6,254,709 B1 | * | 7/2001 | Kamiyama et al. | 156/91 |
| 6,296,729 B1 | * | 10/2001 | Kamiyama et al. | 156/93 |
| 6,619,886 B1 | * | 9/2003 | Harrington | 405/184.2 |

\* cited by examiner

*Primary Examiner*—Patrick Brinson
(74) *Attorney, Agent, or Firm*—Michael I. Wolfson; Greenberg Traurig LLP

(57) ABSTRACT

A reinforced liner for cured in place pipe rehabilitation of an existing pipeline having a plurality of high-strength low-elongation fiber bundles disposed circumferentially around the tubular liner at both inner and outer surfaces of a resin absorbent layer of the liner is provided. The bundles of reinforcing fibers are continuous lengths of high modulus fibers laid circumferentially with the ability to stretch to accommodate variations in host pipe diameter. The ends of reinforcing fibers on the inner and outer reinforcing layers overlap so that the ends slide past each other as the liner is expanded prior to cure. The reinforcing fibers may be secured to a porous scrim to form an inner tubular reinforcing layer. An outer layer of bundles of reinforcing fiber are formed into a tube about the absorbent layer. An outer impermeable tubular layer is wrapped around the inner layers. The reinforcing layer may include longitudinal reinforcing fiber in either or both reinforcing layers to increase the longitudinal strength of the liner.

20 Claims, 8 Drawing Sheets

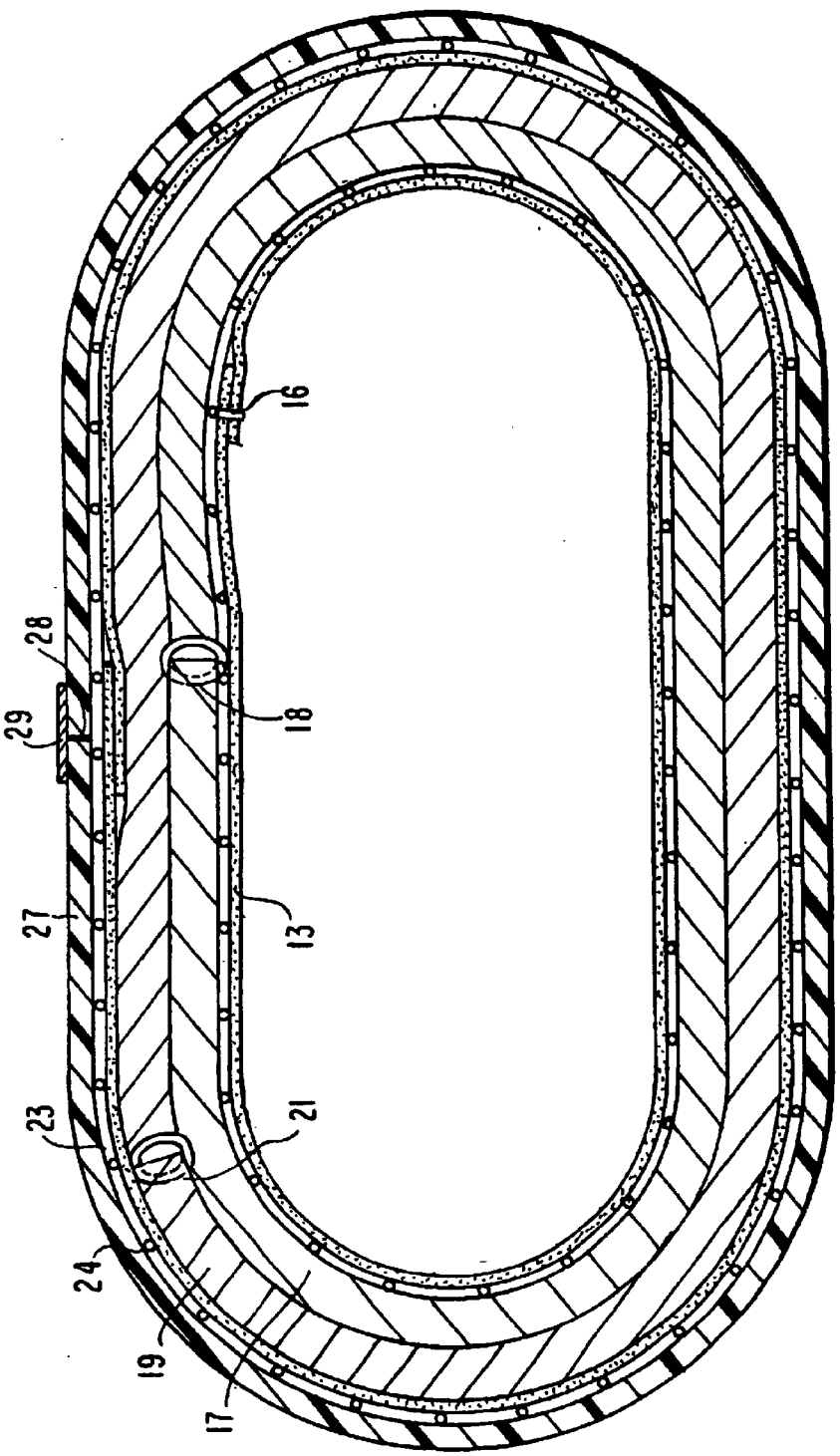

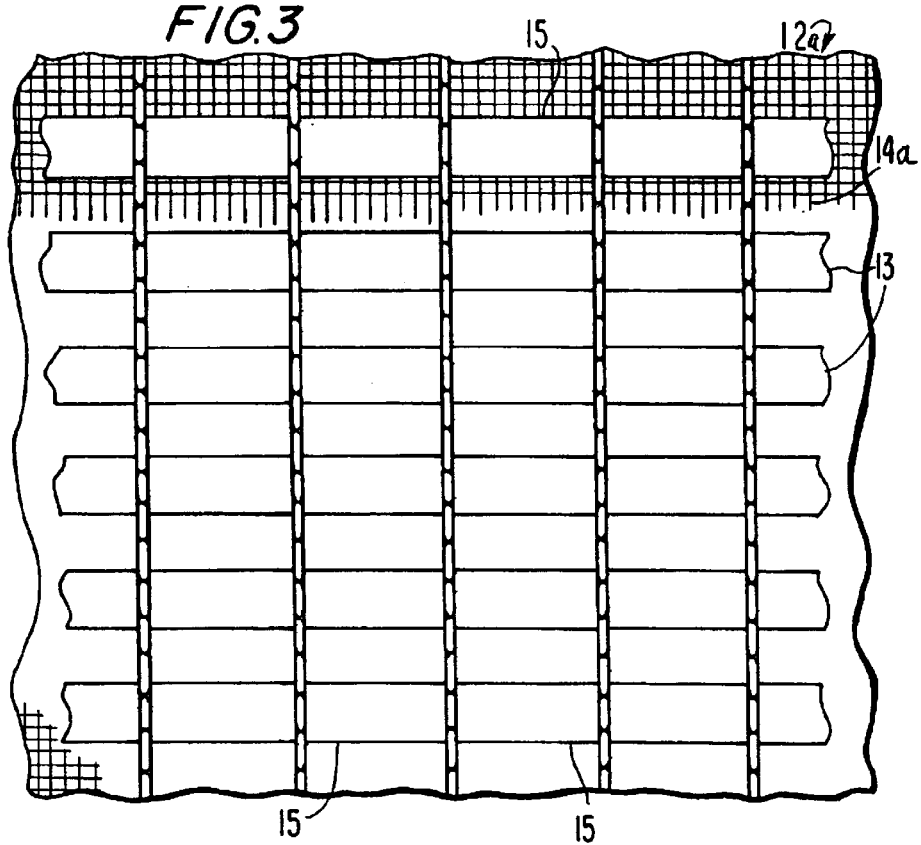
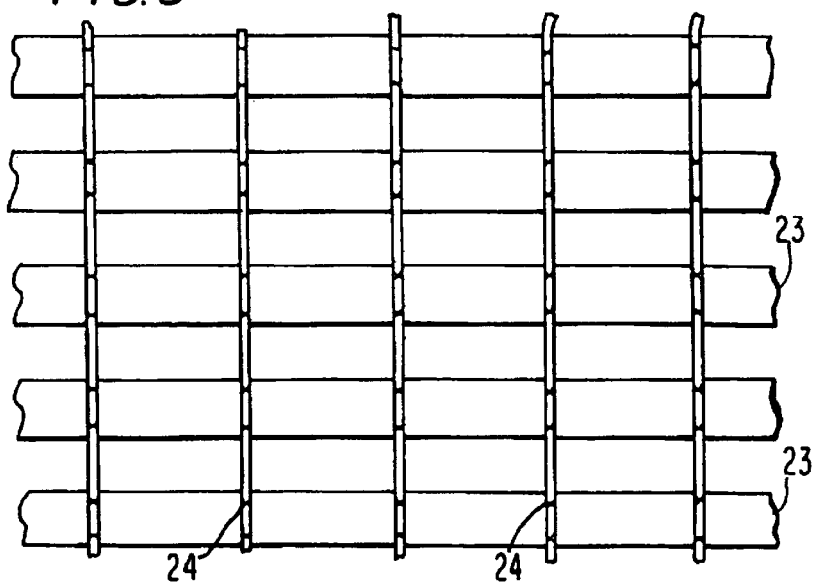

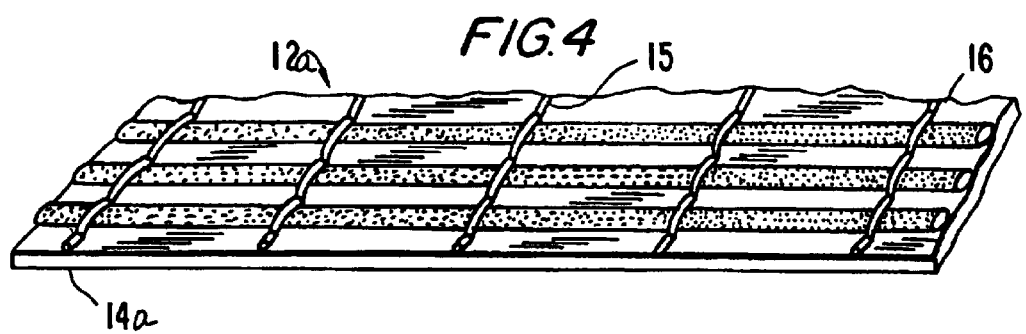
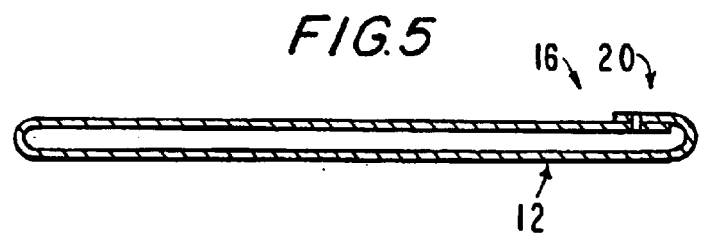
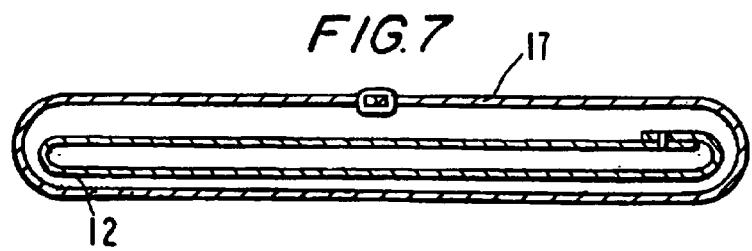

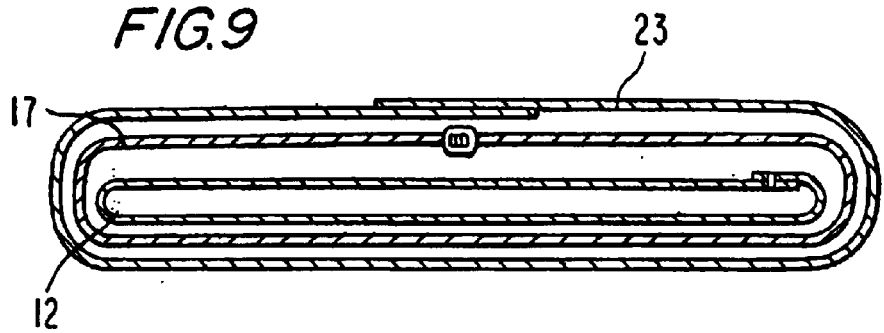
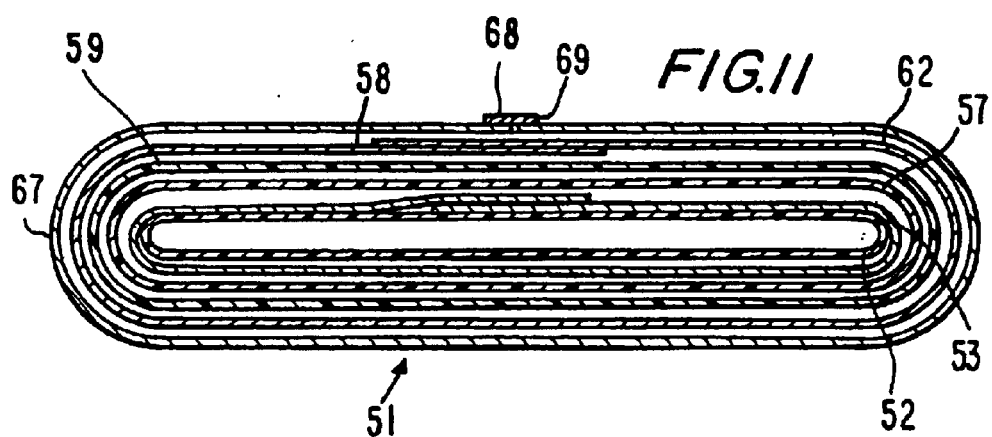
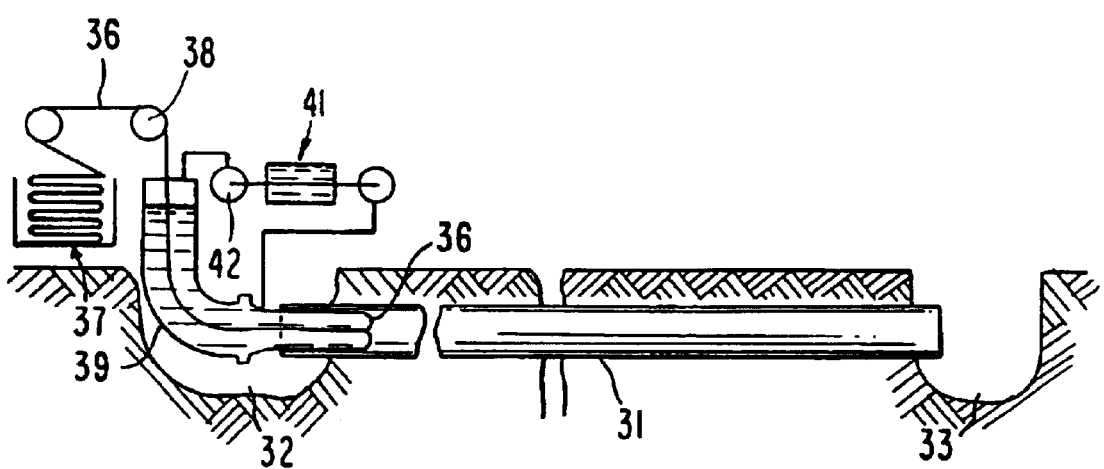

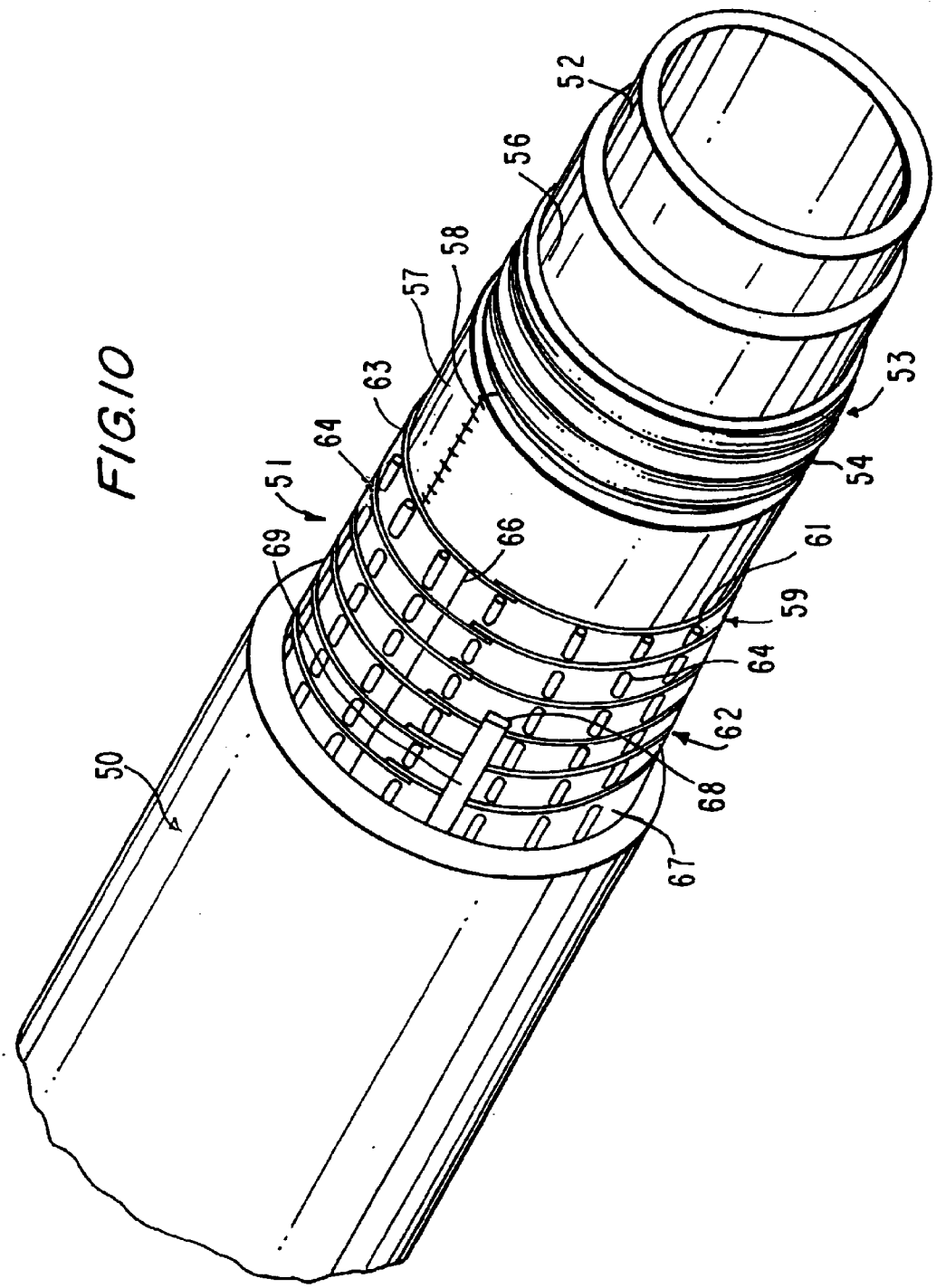

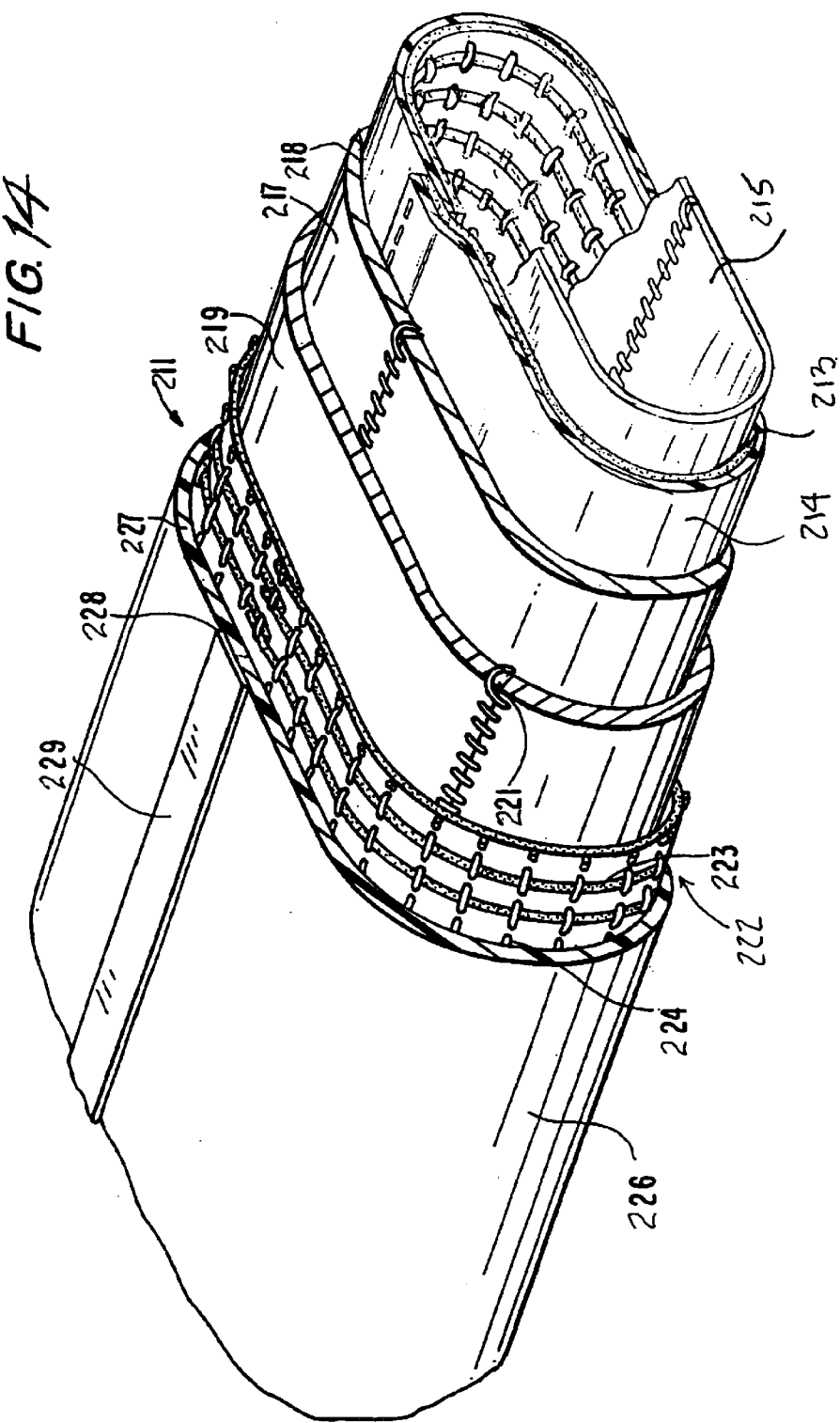

FIBER REINFORCED COMPOSITE LINER FOR LINING AN EXISTING CONDUIT AND METHOD OF MANUFACTURE

CROSS-REFERENCE TO RELATED APPLICATION

This application is a continuation-in-part of application Ser. No. 10/098,972 filed on Mar. 14, 2002 now U.S. Pat. No. 6,708,729.

BACKGROUND OF THE INVENTION

This invention relates to a fiber reinforced composite liner of flexible resin absorbent material, and more particularly to a composite liner having bundles of high-strength low-elongation fiber layers disposed circumferentially around the tubular liner adjacent to both inner and outer surfaces of the liner with at least one layer of resin absorbent material between the fiber reinforcing layers to increase the resistance to buckling of the cured liner.

It is generally well known that conduits or pipelines, particularly underground pipes, such as sanitary sewer pipes, storm sewer pipes, water lines and gas lines that are employed for conducting fluids frequently require repair due to fluid leakage. The leakage may be inward from the environment into the interior or conducting portion of the pipelines. Alternatively, the leakage may be outward from the conducting portion of the pipeline into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles on the overhead surface or similar natural or man made vibrations, or other such causes. Regardless of the cause, such leakages are undesirable and may result in waste of the fluid being conveyed within the pipeline, or result in damage to the surrounding environment and possible creation of a dangerous public health hazard. If the leakage continues it can lead to structural failure of the existing conduit due to loss of soil and side support of the conduit.

Because of ever increasing labor and machinery costs, it is increasingly more difficult and less economical to repair underground pipes or portions that may be leaking by digging up and replacing the pipes. As a result, various methods had been devised for the in place repair or rehabilitation of existing pipelines. These new methods avoid the expense and hazard associated with digging up and replacing the pipes or pipe sections, as well as the significant inconvenience to the public. One of the most successful pipeline repair or trenchless rehabilitation processes that is currently in wide use is called the Insituform® Process. The Insituform Process for the cured in place pipe ("CIPP") installation is described in U.S. Pat. Nos. 4,009,063, 4,064,211 and 4,135,958, the contents of all of which are incorporated herein by reference.

Flexible tubular liners suitable for use in the Insituform Process are generally flexible tubes of two or more layers of resin absorbent material. Typically the resin absorbent material is a needled felt of a synthetic fiber, such as polyester, but may be acrylic, polypropylene, or an inorganic fiber, such as glass or carbon. The cured-in-place-pipe liner generally includes two or more layers of resin absorbent material, but may include several layers, depending on the desired ultimate thickness of the liner and the diameter of the conduit to be lined. The inner tubular layer or layers are usually uncoated on both sides. The outer layer has an impermeable layer on the outer surface so that resin impregnated into the resin absorbent layers may be retained within the resin absorbent material. A method for producing such flexible tubular liners having at least two layers with the outer layer having an outer impermeable layer is described in detail in U.S. Pat. No. 5,285,741. The contents of this patent are incorporated herein by reference.

There are many suggestions in the prior art to reinforce a CIPP liner by addition of filamentary or other materials. The '063 patent suggests attaching a scrim web to the filled layers. Similarly, in WO 91/14896 I suggest wrapping one or more reinforcement layers of a synthetic fiber and/or glass about an inner resin absorbent tube to increase the hoop strength of the resulting rigid pipe. An outer resin absorbent tube having an impermeable coating is disposed about the reinforcement layer or layers. It had been earlier suggested by Eric Wood in U.S. Pat. No. 4,836,715 to incorporate reinforcing layers near the inner and outer surfaces of the lining to simultaneously protect against buckling and ovality, respectively. The reinforcing fabric layers are provided in the form of fabric layers of glass and polyamide that extend generally circumferentially of the tubular lining. More recently, in U.S. Pat. No. 5,868,169 a layer of reinforcing fibers, such as fiberglass is encapsulated between layers of resin absorbent material saturated with resin. The reinforcing fibers in the form of a mesh or mat of fiberglass are fixedly attached to the inner and outer layers of resin absorbent material.

In the standard practice of the Insituform Process an elongated flexible tubular liner of a felt fabric, foam or similar resin absorbent material with an outer impermeable coating is impregnated with a thermosetting curable resin. Generally, the liner is installed within the existing conduit utilizing an eversion process, as described in the later two identified Insituform patents. In the eversion process, radial pressure applied to the interior of an everted liner presses it against and into engagement with the inner surface of the pipeline. The Insituform Process is also practiced by pulling a resin impregnated liner into the conduit by a rope or cable and using a separate fluid impermeable inflation bladder or tube that is everted within the liner to cause the liner to cure against the inner wall of the existing pipeline.

A curable thermosetting resin is impregnated into the resin absorbent layers of a liner by a process referred to as "wet out." The wet-out process generally involves injecting resin into resin absorbent layers through an end or an opening formed in the outer impermeable film, drawing a vacuum and passing the impregnated liner through nip rollers as is well known in the lining art. One such procedure of this vacuum impregnation is described in Insituform U.S. Pat. No. 4,366,012, the contents of which are incorporated herein by reference. A wide variety of resins may be used, such as polyester, vinyl esters, epoxy resins and the like, which may be modified as desired. It is preferable to utilize a resin which is relatively stable at room temperature, but which cures readily when heated with air, steam or hot water, or subjected to appropriate radiation, such as ultraviolet light.

The CIPP flexible tubular liners have an outer smooth layer of relatively flexible, substantially impermeable polymer in its initial state. When everted, this impermeable layer ends up on the inside of the liner after the liner is everted during installation. As the flexible liner is installed in place within the pipeline, the liner is pressurized from within, preferably utilizing an eversion fluid, such as water, air, or steam to force the liner radially outwardly to engage and conform to the interior surface of the existing pipeline. Typically, cure is initiated by introduction of hot water into the everted liner through a recirculation hose attached to the end of the everting liner or by introduction of steam. The resin impregnated into the absorbent material is then cured to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

While the present suggestions to increase strength and resistance to buckling of the cured liner are available, use of high modulus fiber layers substantially increase the cost of raw materials and introduce difficulties in handling webs and attaching them to one of the resin absorbent layers. Moreover, it has been found that placement of layers of reinforcing fiber between layers of resin absorbent material does not provide for sufficient increases in buckling resistance to justify the additional costs. Thus, the prior art does not teach a construction that allows obtaining the desired improvements by placing reinforcing fibers at the outside surfaces of the composite.

Accordingly, it is desirable to provide a reinforced liner that can provide increased resistance to buckling at a reduction in cost compared to liner presently utilized and disclosed in the prior art.

SUMMARY OF THE INVENTION

Generally speaking, in accordance with the invention, a reinforced composite tubular liner for cured in place pipe rehabilitation of an existing pipeline having a plurality of high-strength low-elongation fiber bundles disposed circumferentially at the inner and outer surfaces of the liner is provided. The bundles of reinforcing fibers are continuous lengths of reinforcing fibers laid out in tubular form adjacent to and parallel to each other on the inner and outer surfaces of at least one resin absorbent tubular layer therebetween. The inner reinforcing layer is bundles of reinforcing fibers that may be attached to a thin porous scrim folded over and stitched along the edge to form a tube. A resin absorbent layer or layers are wrapped about the inner reinforcing tubular layer and joined at the edges to form a tube. The resin absorbent layers are formed into tubes by any convenient means, such as sewing, flame bonding, or adhesively joined. An outer reinforcing layer of reinforcing fiber bundles held together by longitudinal stitching is then wrapped around the resin absorbent layer to form an outer tubular layer with the ends of the bundles of reinforcing fibers overlapping. This allows the reinforcing fiber bundles to slide past each other when the tube is everted and expanded.

The increase in stiffness of the cured liner allows for a reduction of thickness of the resin absorbent layer and corresponding reduction in amount of resin used. This offsets any increase in cost due to the high modulus fiber and manufacturing costs. It is possible to reduce the weight of resin by half and yet obtain buckling strengths 50 percent more than for a non-reinforced liner. The reinforcing fiber bundles are laid out so that they are present between about 1 bundle every inch to about 3 or 4 bundles per inch. The reinforcing fibers can be any high-strength low-elongation organic fiber, such as polyester, polypropylene, nylon, carbon, Aramid, or inorganic fiber, such as glass or steel. In the preferred embodiment, the reinforcing fiber is carbon fiber.

Accordingly, it is an object of the invention to provide an improved reinforced cured in place liner that provides increased resistance against buckling with less resin than presently available.

It is another object of the invention to provide an improved reinforced cured in place liner having at least two reinforcing layers on the outside surfaces of at least one resin absorbent layer at the surfaces of the liner.

Yet another object of the invention is to provide an improved reinforced cured in place liner having increased stiffness to increase buckling resistance.

Still another object of the invention is to provide an improved reinforced cured in place liner having lower overall material cost and manufacturing cost.

A further object of the invention is to provide an improved fiber reinforced cured in place liner having reduced thermal shrinkage after curing, Still a further object of the invention is to provide an improved reinforced cured in place liner of reduced thickness and weight to provide reduced resistance to flow.

Yet a further object of the invention is to provide an improved reinforced composite cured in place liner so that extremely long lengths of liner can be pulled into an existing conduit prior to inflation.

It is another object of the invention to provide an improved method of manufacture of a fiber reinforced cured in place liner.

Still other objects and advantages of the invention will in part be obvious and will in part be apparent from the specification.

The invention accordingly comprises the several steps and the relation of one or more of such steps with respect to each of the others, and the product which possesses the characteristics, properties and relation of constituents, all as exemplified in the detailed disclosure hereinafter set forth, and the scope of the invention will be indicated in the claims.

BRIEF DESCRIPTION OF THE DRAWINGS

FIG. 2 is a cross-section of the liner of FIG. 1 taken along line 2—2;

FIG. 3 is a plan view showing bundles of reinforcing fibers stitched to a porous netting material;

FIG. 4 is a schematic perspective view of the stitched reinforcing fibers of FIG. 3 formed into a tube;

FIG. 5 is a cross-sectional schematic view showing the seam of the tube of FIG. 4 folded back for expansion;

FIG. 6 is a cross-sectional in schematic view of an alternative arrangement for folding the inner reinforcing layer of FIG. 4;

FIG. 7 is a cross-sectional schematic view illustrating wrapping of a resin absorbent layer about the inner reinforcing layer of FIG. 5;

FIG. 8 is a plan view of the reinforcing layer of stitched carbon fiber to be wrapped around the resin absorbent layer of FIG. 7;

FIG. 9 is a cross-sectional schematic view illustrating the outer reinforcing layer wrapped about the resin absorbent layer of FIG. 7;

FIG. 10 is a perspective view showing another composite reinforced cured in place liner constructed and arranged in accordance with the invention;

FIG. 11 is a schematic cross-section view showing an arrangement of elements of the liner of FIG. 10;

FIG. 12 is a schematic sectional view illustrating a typical eversion of a cured in place pipe liner;

FIG. 14 is a perspective view showing a composite reinforced liner as shown in FIG. 13 with the reinforcing fibers secured to a porous substrate.

DESCRIPTION OF THE PREFERRED EMBODIMENTS

Figure 1:
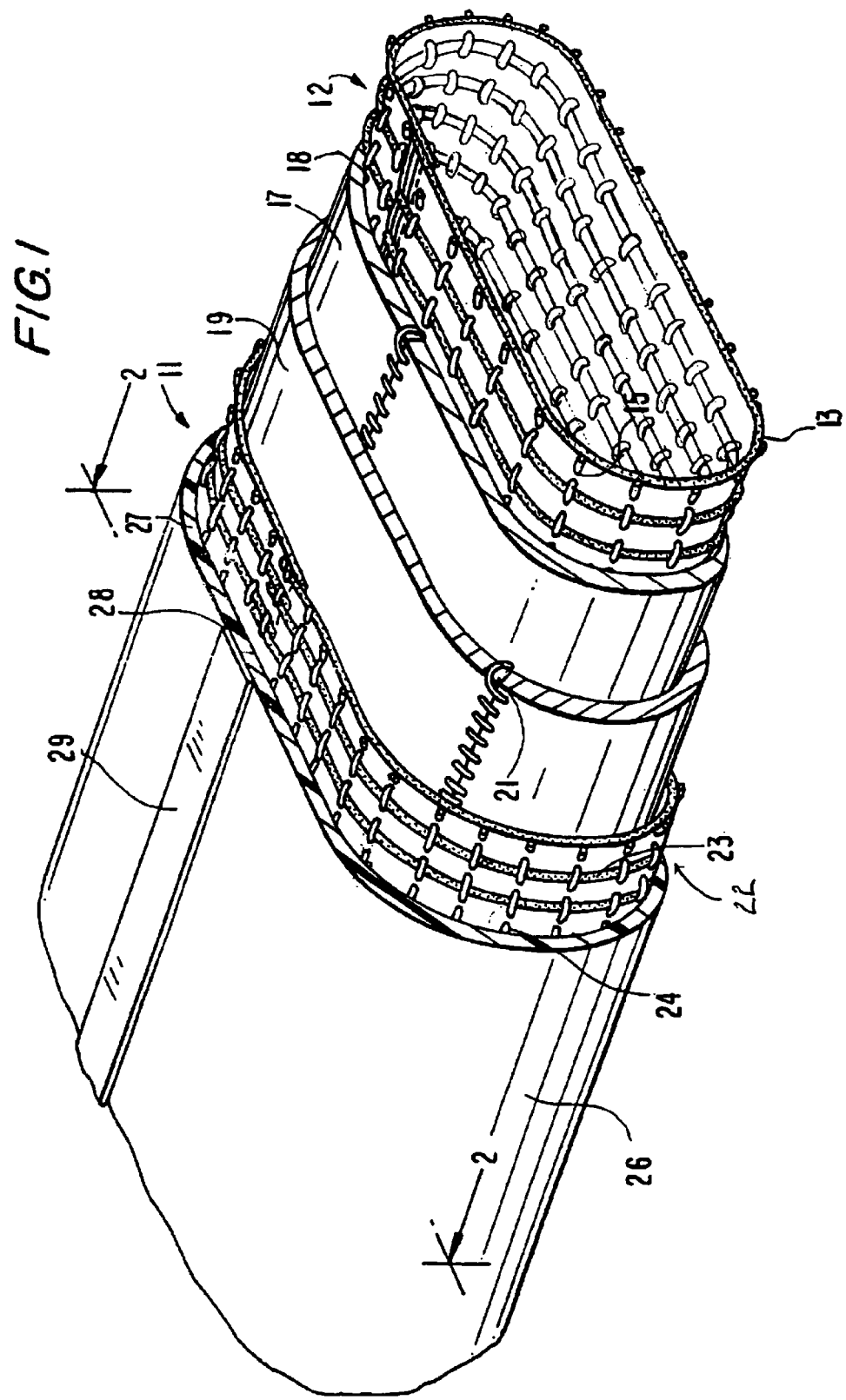
FIG. 1 is a perspective view showing a composite reinforced cured in place liner constructed and arranged in accordance with the invention.

By incorporating high modulus fibers in the lining structure the flexural and compressive moduli of the lining can be increased so that thinner linings can be used for a given design pressure. Such reinforcing fibers may be arranged in one axis, in one plane or randomly in all three axes (as with standard felt), but the volume fraction of the reinforcement is minimized and the axial modulus and strength are maximum when the fibers are in one axis and reduce rapidly when the other structures are used. Linings require circumferential strength and stiffness so fibers should be aligned in the circumferential direction and the most economical use is in two layers at the outside surfaces.

The following table compares properties of glass fibers and certain available lower cost carbon fibers.

withstand external pressure. Even including circumferentially oriented fibers near the center of the composite only increases cost without increasing the flexural modulus although they will increase the compressive modulus.

The theory above shows how fibers with moduli significantly higher than the resin/felt can be used to achieve high laminate moduli. Typical fibers include glass, carbon, Aramid and the like. Any fiber with a high modulus and the ability to adhesively bond to the resin may be used and the fiber used will be chosen on the basis of the economics and environmental factors so that it will not degrade in service.

Conveniently the fibers are made into the weft (cross direction) threads of a fabric structure. This may be done by a weaving process but in the preferred embodiment they are sewn onto a previously made fabric or felt. It is necessary, for wetting out the linings with resin, that the fabrics will allow the passage of resin through themselves. In a preferred embodiment of the invention one fabric (as shown in FIG. 3) a knitted net layer made of polyester, nylon or other suitable fiber, with the reinforcing fibers sewn across it. Another fabric may be a thin felt layer of similar fibers, again with the reinforcing fibers sewn across. The thin felt may be produced by any of number of means including needle punching, spun bond, hydro-entangled and thermal bond. Another useful fabric is shown in FIG. 8 in which the reinforcing fibers are held only by the longitudinal stitching. The weight of fiber per unit area of fabric may be varied by using differing weights of fiber per unit length or by varying the spacing between the fiber bundles. The weight per unit area can thus be controlled to give the desired properties as explained in the theory above.

In one embodiment of the invention one or both layers of fabric incorporate longitudinal reinforcing fibers to control

TABLE I

| Property | Carbon Fiber | Glass Fiber | Uni-directional Carbon + resin | Uni-directional Glass + resin | Bi-axial Glass + resin |
|---|---|---|---|---|---|
| Tensile Strength psi | 450,000 | 350,000 | 182,000 | 161,000 | 80,000 |
| Tensile Modulus | 33,000,000 | 11,600,000 | 21,000,000 | 7,500,000 | 3,000,000 |
| S.G. | 1.7 | 2.54 | 1.5–1.6 | 2–2.1 | |
| Elongation At break | 1.2 | 4.6 | 1.2 | 3.5 | ? |
| Flexural Strength | | | 290,000 | 170,000 | 80,000 |
| Flexural Modulus | | | 18,000,000 | 7,500,000 | 2,800,000 |

The optimum design uses the reinforcing fibers near the outside of the laminate with the (relatively) low cost per unit volume resin/felt at the center.

Theory predicts that the flexural modulus of the composite will be given by the expression:

$$E_F = E_{resin} + (E_{reinf} - E_{resin}) \times (t_2^3 - t_3^3)/t_1^3$$

The compressive modulus is:

$$E_{comp} = E_{resin} + (E_{reinf} - E_{resin}) \times (t_2 - t_3)/t_1$$

Where $t_1$=overall thickness and $t_2$ and $t_3$ are the thicknesses at the outside and inside of the reinforcement respectively. $E_{resin}$ is the modulus of the resin and felt matrix and $E_{reinf}$ is the modulus of the reinforcement plus resin.

The inclusion of relatively high cost per unit volume reinforcing fibers in any direction other than the hoop direction will increase the cost per unit volume without increasing the moduli in the hoop direction nor the ability to longitudinal stretch. These fibers are sewn into the fabric by the same threads that secure the circumferential fibers.

Typically the reinforcing fibers are sewn to the backing fabrics with longitudinal chain stitches spaced at intervals ranging from about three per inch to about one per two inches across the width. The advantage of sewing the reinforcing fibers to fabric materials is that the edges of the fabric materials may be joined by sewing or other means to form tubular structure with circumferential reinforcing fibers. However, in one embodiment of the invention tubular structures are made by circular weaving in which the reinforcing fibers are the circular weft and they are woven or sewn to warp threads of any suitable fiber such as nylon, polyester or other material.

In practice, pipes that need repair frequently vary in circumference over their length either because of inaccuracy during construction or by subsequent wear and erosion. The tubes with which they are lined must be able to accommodate this variation in circumference and this is achieved by making them under size but with the ability to stretch up to the maximum circumference under the influence of the pressure of the installation fluid. Whereas the felt materials have good elongation characteristics the reinforcing fibers are substantially inextensible. In this invention the problem is overcome by providing substantial overlaps in the reinforcing fibers which overlaps are free to slide to accommodate the variations in circumference.

FIG. 1 illustrates in perspective a composite cured in place resin absorbent liner 11 constructed and arranged in accordance with the invention. Liner 11 is constructed from an inner reinforcing layer 12 formed from a plurality of bundles of carbon fibers secured in position spaced apart and parallel by a series of parallel stitches 15. Inner reinforcing layer 12 is formed by laying down a plurality of bundles of carbon fibers in a predetermined pitch and securing in place by a plurality of stitch lines 15. Inner reinforcing layer 12 is formed into a tube by overlapping the ends of the bundles and securing them for handling by a temporary longitudinal stitch line 16 along the overlap.

A first inner resin absorbent layer 17 is wrapped about inner reinforcing layer 12 and formed into a tube by a butt seam 18. In the embodiment illustrated, resin absorbent layer 17 is a needled polyester felt, but may be any resin absorbent material, such as an acrylic or the like. An outer resin absorbent layer 19 of the same resin absorbent material is disposed about inner layer 17 and stitched along a seam 21 for forming an outer resin absorbent tube.

An outer reinforcing layer 22 formed of a plurality of spaced bundles of carbon fibers 23 is disposed about outer resin absorbent layer 19. Outer reinforcing layer 22 include carbon fibers 23 stitched together by a plurality of stitches 24. Alternatively, carbon fibers 23 may be stitched to an open porous scrim or a thin resin absorbent layer, such as a felt, but in this embodiment in FIG. 1 are merely stitched by stitches 24.

Finally, an outer impermeable layer 26 is disposed about outer reinforcing layer 22. Outer impermeable 26 is generally a thermoplastic film, such as polyethylene, polypropylene, polyurethane, PVC and the like which will allow liner 11 to be inverted by fluids such as water, air and or steam. Outer layer 26 is secured into a tubular form by a butt seam 28 or other joining operations and overlaid with a tape 29 or extrusion for rendering outer layer 26 impermeable to fluids under pressure.

As shown in FIG. 3, a reinforcing layer 12a may include a highly porous scrim 14a. This permits resin that will be impregnated into liner 11 to flow from one surface to the other surface when liner 11 is in a lay flat condition during the typical wet-out procedure. This wet out procedure is well known in the art and one such process is described in U.S. Pat. No. 4,366,012.

Reinforcing fibers 13 and 23 can be any high-strength low-elongation organic or inorganic fiber. The modulus of a typical resin/polyester felt is between about 250 to 400×10$^3$ p.s.i. Carbon fiber has a modulus of 33×10$^6$ p.s.i. and glass is 10×10$^6$. The physical properties of carbon fiber and E-glass compared to conventional resin/polyester felt materials are as set forth in Table II.

TABLE II

| Material | E Modulus p.s.i. | Relative Density | Coefficient of Thermal Expansion* |
|---|---|---|---|
| Resin/felt | 250 to 400 × 10$^3$ | 1.2 to 1.3 | 30 × 10$^{-6}$ in/in ° F. |
| Carbon Fiber | 33 × 10$^6$ | 1.77 | −.05 × 10$^{-6}$ in/in ° F. |
| E-Glass | 10 × 10$^6$ | 2.54 | |

*Measured between 75° and 195° F.

Carbon fiber is known to be more expensive than glass for the same reinforcing property. However, as the price decreases this difference disappears in view of the three times greater modulus of the carbon fiber compared to glass. This is due to the fact that the volume of reinforcing fiber needed is inversely proportional to the modulus. In view of this, only one-third the volume of carbon compared to that of glass is required.

Examples of reinforcing fibers include glass, polyester, polypropylene, nylon, carbon, Aramid, steel and the like. Preferably the fiber is carbon or glass. Fibers are available in bundles or tows containing multiple single fibers. The tows may be combined to give the optimum amount of fiber reinforcement. In a preferred embodiment the tows are of carbon fiber and each tow contains between 30,000 and 100,000 individual fibers. Such tows will give between 200 and 750 feet per pound. The spacing between the tows in the reinforcing layers may also be varied to give the optimum properties to the cured pipe liner.

If glass is used it may be type E glass bundles with strands having a continuous length at approximately 750 feet per pound or about 2,000 TEX. Each bundle of glass fiber has a break strength of about 250 pounds. The weight of the glass bundles used may vary from about 100 to 1,000 feet per pound, and preferably from about 350 to 900 feet per pound, and most preferably from about 500 to 800 feet per pound. Alternatively, ECR glass may be used for its superior corrosion resistance.

Carbon fiber reinforced composites are preferred because the carbon fibers are not subject to wicking and corrosion attack from acids and alkalis as are glass reinforced composites. This is an important consideration at lateral openings and at ends of the liners where the fiber in the composite may be exposed to effluent. This also allows placing the reinforcing carbon fibers at the surfaces of the composite where they are most effective in increasing stiffness. This increase in stiffness is extremely sensitive to the thickness of any protective layers outside the reinforcing layers.

Depending on the amount of reinforcing fiber to be introduced, the pitch, or the space between repeating bundles can vary. For a typical underground gravity fed sewer main line, buckling strengths in excess of 50% greater than available without the reinforcement can be obtained with a pitch varying from about 2 bundles per inch to about 4 bundles per inch. Additional strength is obtainable by introduction of additional reinforcing fibers, but this benefit is offset by the additional cost associated with addition of high performance materials into the CIPP liner.

The crux of the design improvement is adding the extra felt/resin layer on the outside of the high modulus fibers (installed condition) to prevent the high modulus fibers from failing prematurely in a compressive buckling mode. This lowers the effective modulus of the composite, but allows it to achieve its ultimate strength; the end result being a structurally superior product. There are additional cost-to-performance benefits with a hybrid construction, using carbon fibers in the tension layer and glass fibers in the compression layer. This is because a polyester resin bonds more effectively to the glass fibers which further improves the composite's ability to resist premature localized buckling failure of the compression layer. The additional layer of felt allows replacement of the sewn/folded overlap as in FIG. 1 in the compression layer of reinforcement, which improves the ability of the liner to expand up to size.

The resin absorbent material of resin absorbent layers 17 and 19 may be of a wide variety of resin absorbent materials. This includes synthetic thermoplastic fibers such as polyester, acrylic, polypropylene, or inorganic fibers such as glass and carbon. Alternatively, the resin absorbent material may be a foam. Typically, resin absorbent material 17 and 19 is a felt of a polyester fiber, usually a needled felt as is well known in the CIPP art. Resin absorbent material 17 and 19 is formed into a tube by a butt seam 18 and 21, respectively as is well known in the art and is described in U.S. Pat. No. 5,285,741. The tube can be joined by any form of sewing, adhesive bonding or flame bonding.

Netting layer 14 is a highly porous sheet of organic or inorganic materials. It may be a thermoplastic material, such as a polyester, polyethylene or polypropylene film that is woven or non-woven or spunbond, or in the case of an inorganic material it may be a glass mat. In the embodiment illustrated herein, netting 14 is a polyester sheet sufficiently porous so that resin impregnated during wet-out will fully saturate both sides of flattened liner 11.

As shown in FIG. 4, once carbon fibers 13 are secured to scrim 14 by stitches 15, reinforcing layer 12 is folded over itself with carbon fibers 13 to the outside or inside depending on placement of an inner reinforcement layer or outer reinforcement layer used in the liner of FIG. 14. Edges of reinforcing layer 12 are overlapped to form a tube and a stitch line 16 between both layers or substrate 14 is made. This stitch keeps carbon fibers in place as liner 11 is everted during installation and accommodate to variations in the host pipe diameter. Since inner reinforcing layer 12 will become the outer layer after inversion, provision for this expansion must be built into composite liner 11. In the embodiment illustrated, stitched edge 16 at overlap 20 as shown in FIG. 5 or 6 allows for bundles of carbon fiber 13 to slide past one another yet remain in the fixed orientation to provide the significant increase in buckling strength obtained in accordance with the invention.

A cross-section of the composite including the inner reinforcing layer and first felt layer 17 is shown in FIG. 7. Outer reinforcing layer 22 formed of parallel bundles of carbon fibers 23 is then disposed about the outer most resin absorbent layer. Here, the edges of outer reinforcing layer 22 overlap each other so that bundles of carbon fibers 23 can slide past one another once liner 11 is everted and expanded. This form of the liner at this point in assembly is illustrated in cross-section in FIG. 9.

Finally, an outer impermeable layer is wrapped about outer reinforcing layer 22 to complete assembly of liner 11. Outer reinforcing layer 22 of stitched carbon fibers illustrated in plain view and in FIG. 8. Outer impermeable layer 26 is joined along a joint line 28 and a tape or extrusion 29 is applied to render outer impermeable layer impermeable to fluid under pressure. Outer impermeable layer may be any flexible thermoplastic material which will render completed liner 11 impermeable to fluids. Such materials include polyurethane, polyethylene, polypropylene, PVC and the like.

Outer impermeable layer 26 includes a thin coating of resin absorbent material 27 on the inner surface. Typically, this may be a fibrous material identical to that of resin absorbent materials of resin absorbent layers 17 and 19. Typically, between 1 to 2 mm in thickness is utilized. Absorbent material 27 allows for impermeable layer 26 to be firmly bonded to the rest of the composite. This also permits carbon fibers 23 to be as close to the inner surface of inverted liner 11 as possible.

Inner reinforcing layer 12 and outer reinforcing layer 22 including carbon fibers 13 and 23 are stitched utilizing any convenient thread. Typically, this can be any polyester or cotton material as the resins utilized are not corrosive and stitches are utilized to hold the positions of the bundles of carbon fibers so that maximum resistance to buckling is obtained in the final cured liner after installation.

Liner 11 may be installed in an existing conduit or pipeline by the eversion method as discussed below in connection with FIG. 12, or by the pull in and inflate method discussed above. In the case of pull in and inflate, a separate eversion bladder may be used to inflate the liner. However, it is possible to assemble a composite liner in accordance with the invention having an integral inner bladder so that such a liner may simply be pulled in and inflated with a fluid, that may be the curing fluid.

Referring now to FIG. 10, a composite cured in place resin absorbent liner 51 having an integral inner tubular impermeable bladder 52 constructed and arranged in accordance with the invention is shown in an existing conduit 50 in perspective. FIG. 11 shows liner 50 in cross-section. Bladder 52 is of any flexible film material of the type that may be used for impermeable layer 26 of liner 11. As in the case of layer 26, bladder 52 may have resin absorbent material bonded to the inner surface facing the composite so that bladder 52 will bond securely to the composite after cure.

Liner 51 is constructed by wrapping an inner reinforcing layer 53 of a plurality of bundles of carbon fibers 54 circumferentially about tubular bladder 51. Inner reinforcing layer 53 is formed by laying down a plurality of bundles of carbon fibers in a predetermined pitch and securing them in place by a plurality of longitudinal stitch lines 56. This may be formed in the same manner as outer layer 22 in liner 11. Inner reinforcing layer 53 is folded over bladder 52 with a generous overlap. The overlap here and in any of the described reinforcing layers should be between one and five inches, but preferably at least about two inches in order to maintain the full strength of the structure.

A first inner resin absorbent layer 57 is wrapped about inner reinforcing layer 53 and formed into a tube by a butt seam 58 or any suitable joining method, such as an overlap seam or adhesively bonded. In the embodiment illustrated, resin absorbent layer 57 is a needled polyester felt, but may be any resin absorbent material, such as an acrylic or the like. An outer resin absorbent layer 59 of the same or different resin absorbent material is disposed about inner layer 57 and stitched along a seam 61 for forming an outer resin absorbent tube.

An outer reinforcing layer 62 formed of a plurality of spaced bundles of carbon fibers 63 is disposed about outer resin absorbent layer 59. Outer reinforcing layer 62 include fibers 63 stitched together by a plurality of longitudinal stitches 64. Alternatively, carbon fibers 63 may be stitched to an open highly porous netting as used in layer 12 of liner 11, but in this embodiment fibers 63 are merely stitched by stitches 64. After wrapping about resin absorbent layer 59, layer 62 is stitched at the edge by a longitudinal seam 66.

Finally, an outer impermeable layer 67 is disposed about outer reinforcing layer 62. Outer impermeable layer 67 is generally a thermoplastic film as described above in connection with impermeable layer 26 of liner 11. As in the case of layer 26, bladder 52 may have resin absorbent material bonded to the inner surface facing the composite so that bladder 52 will bond securely to the composite after cure. Outer layer 67 is secured into a tubular form by a butt seam 68 or other joining operation and overlaid with a tape 69 or extrusion for rendering outer layer 67 impermeable to fluids under pressure. This will allow liner 51 to be everted if desired.

Liner 51 is designed for pulling into place and being directly inflated. For this method liner 57 is built in the opposite order from that described above with respect to liner 11. Outer reinforcing layer 62 in which reinforcing fibers 63 are sewn together as in FIG. 8 to a netting structure as shown in FIG. 3 permits resin readily to impregnate the inner layers from the outside. In this embodiment there is no need to sew a seam in inner reinforcing layer 53 and seam 66 in outer reinforcing layer 62 is sewn along the edge of the outer overlap as shown in FIG. 11 with a comparatively weak thread. This will hold the overlap in position during the wet out process. This sewing thread of seam 66 is designed to break under the influence of the inflation pressure to allow the overlap to slide.

Referring now to FIG. 12, a schematic illustration of a typical eversion of a cured in place pipe liner for rehabilitation of an existing conduit 31 from a first manhole access 32 to a second manhole access 33. An impregnated composite liner 36 of the type described in connection with liner 11 of FIG. 1 that has been wet out with resin is supplied in a folded configuration 37. Liner 36 is fed over rollers 38 to a down tube 39 in a form of an elbow terminating at access to an underground conduit 31. Liner 36 is fed through down tube 39, folded back and banded to the endpoint of down tube 39. An everting fluid, such as water in a reservoir 41 is fed via a pump 42 to down tube 39 thereby turning liner 36 inside out and into existing conduit 31. Resin impregnated into liner 36 can be cured by any known means such as by application of heat, various forms of radiations, ultrasonics or other known energy means. After cured, liner 36 becomes a new pipe within existing conduit 31.

Figure 13:
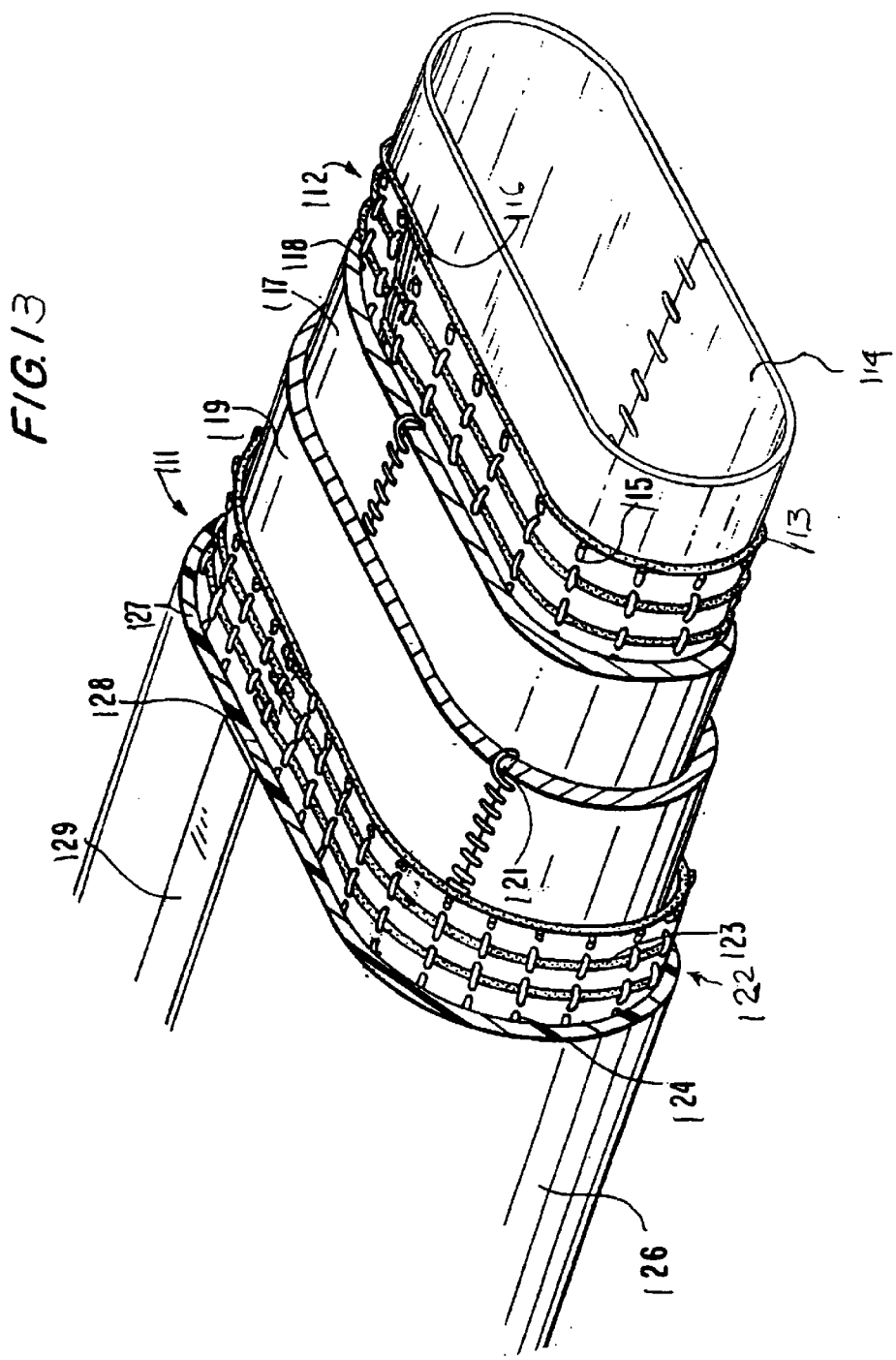
FIG. 13 is a perspective view showing a composite reinforced liner as shown in FIG. 7 with an inner resin absorbent tubular layer.

FIG. 13 illustrates in perspective a composite cured in place resin absorbent liner 111 constructed and arranged in accordance with another embodiment of the invention. Liner 111 is constructed from an inner reinforcing layer 112 formed from a plurality of bundles of carbon fibers 113 on an inner stitched tube 114 of resin absorbent material. Carbon fibers 113 are secured in position spaced apart and parallel about tube 114 by temporary bonds of parallel stitches 115. Inner reinforcing layer 112 is formed by laying down a plurality of bundles of carbon fibers in a predetermined pitch and securing in place by a plurality of stitch lines 115. Inner reinforcing layer 112 is formed into a tube by overlapping the ends of the bundles and securing them for handling by a longitudinal stitch line 116 along the overlap.

A first inner resin absorbent layer 117 is wrapped about inner reinforcing layer 112 and formed into a tube by a butt seam 118. In the embodiment illustrated, resin absorbent layer 117 is a needled polyester felt, but may be any resin absorbent material, such as an acrylic or the like. An outer resin absorbent layer 119 of the same resin absorbent material is disposed about inner layer 117 and stitched along a seam 121 for forming an outer resin absorbent tube.

An outer reinforcing layer 122 formed of a plurality of spaced bundles of carbon fibers 123 is disposed about outer resin absorbent layer 119. Outer reinforcing layer 122 include carbon fibers 123 stitched together by a plurality of stitches 124. Alternatively, carbon fibers 123 may be stitched to a thin resin absorbent layer or an open porous scrim or a thin resin absorbent layer, such as a felt, but in this embodiment in FIG. 1 are merely stitched by stitches 124.

Finally, an outer impermeable layer 126 is disposed about outer reinforcing layer 122. Outer impermeable 126 is generally a thermoplastic film, such as polyethylene, polypropylene, polyurethane, PVC and the like which will allow liner 111 to be inverted by fluids such as water, air and or steam. Outer layer 126 is secured into a tubular form by a butt seam 128 or other joining operations and overlaid with a tape 129 or extrusion for rendering outer layer 126 impermeable to fluids under pressure.

FIG. 5 illustrates in perspective a composite cured in place resin absorbent liner 211 constructed and arranged in accordance with another embodiment of the invention. Liner 211 is constructed from an inner reinforcing layer 212 formed from a plurality of bundles of carbon fibers 213 on a porous scrim, felt or netting layer 214 about an inner stitched tube 215 of resin absorbent material. Carbon fibers 213 are secured in position spaced apart and parallel on substrate 214 by a series of parallel stitches 215. Inner reinforcing layer 212 is formed by laying down a plurality of bundles of carbon fibers in a predetermined pitch and securing in place by a plurality of stitch lines 215. Inner reinforcing layer 212 is formed into a tube with edges overlapped and secured for handling by a longitudinal stitch line 216 along the overlapped edges.

A first inner resin absorbent layer 217 is wrapped about inner reinforcing layer 212 and formed into a tube by a butt seam 218. In the embodiment illustrated, resin absorbent layer 217 is a needled polyester felt, but may be any resin absorbent material, such as an acrylic or the like. An outer resin absorbent layer 219 of the same resin absorbent material is disposed about inner layer 217 and stitched along a seam 221 for forming an outer resin absorbent tube.

An outer reinforcing layer 222 formed of a plurality of spaced bundles of carbon fibers 223 is disposed about outer resin absorbent layer 219. Outer reinforcing layer 222 include carbon fibers 223 stitched together by a plurality of stitches 224. Alternatively, carbon fibers 223 may be stitched to a thin felt layer or scrim, but in this embodiment are stitched by stitches 224 to a felt layer.

Finally, an outer impermeable layer 226 is disposed about outer reinforcing layer 222. Outer impermeable 226 is generally a thermoplastic film, such as polyethylene, polypropylene, polyurethane, PVC and the like which will allow liner 211 to be inverted by fluids such as water, air and or steam. Outer layer 226 is secured into a tubular form by a butt seam 228 or other joining operations and overlaid with a tape 229 or extrusion for rendering outer layer 226 impermeable to fluids under pressure.

As can be readily seen, there is provided a convenient means of increasing the hoop strength and resistance to buckling of a flexible cured in place liner while substantially decreasing the amount of thermosetting resin utilized. Consequently, the cost to form the liner having strength greater than that possible without the reinforcement is obtained. By disposing high-strength low-elongation reinforcing fibers around the inner surface and around the outer surface to provide a sandwich construction that provides substantially increased hoop strength is provided. This allows a significant advantage over the prior art suggestions of disposing various types of reinforcing layers sandwiched between resin absorbent layers or by disposing and/or wrapping various types of random chopped filaments either within or about the resin absorbent layers.

It may be also desirable to include longitudinal reinforcing fibers to control longitudinal stretch in either or both of the reinforcing layers. These fibers are sewn into the fabric by the same threads that secure the circumferential high strength fibers. A longitudinal reinforcing fiber can be any high-strength low-elongation fiber, such as glass, polyester, polypropylene, nylon, carbon, Aramid and even steel.

It will thus be seen that the object set forth above, among those made apparent from the preceding descriptions, are efficiently attained and, since certain changes may be made in carrying out the processes, in the described products and in the construction set forth without departing from the spirit and scope of the invention, it is intended that all matter contained in the above description and shown in the accompanying drawings will be interpreted as illustrative and not in a limiting sense.

It is also understood that the following claims are intended to cover all of the generic and specific features of the invention herein described and all statements of the scope of the invention which, as a matter of language might be said to fall therebetween.

Particularly, it is to be understood that in the claims, ingredients or compounds recited in the singular are intended to include compatible mixtures of such ingredients, whenever the sense permits.

What is claimed is:

1. A composite tubular liner suitable for the trenchless rehabilitation of existing conduits, comprising:
    an inner layer of a resin absorbent material joined at its edges to form a tube;
    an inner layer of a plurality of bundles of high modulus fibers disposed circumferentially on the outer surfaces of the inner resin absorbent material;
    at least one outer layer of resin absorbent material joined at its edges to form a tube about the inner layer of high modulus fibers:
    an outer layer of a plurality of bundles of high modulus fibers disposed circumferentially on the outer surfaces of the outer resin absorbent material
    an impermeable layer disposed about the outer layer of high modulus fibers; and
    the bundles of high modulus fibers aligned circumferentially on both sides of the at least one outer resin absorbent layer with the ends of the bundles overlapping so that upon installation and expansion of the tubular composite, the ends of the high modulus fibers slide past each other to allow for expansion to the wall of the existing conduit before the resin is cured.

2. The composite tubular liner of claim 1, wherein the resin absorbent material is a needled felt.

3. The composite tubular liner of claim 2, wherein the needled felt is polyester.

4. The composite tubular liner of claim 1, wherein the resin absorbent material is joined by one of a butt seam, flame bonding and adhesive.

5. The composite liner of claim 1, wherein the inner layer of high modulus fibers are disposed on and secured to a porous substrate facing the inner layer of resin absorbent material.

6. The composite liner of claim 5, wherein the porous substrate is a polyester netting.

7. The composite liner of claim 5, wherein the porous substrate is a resin absorbent material.

8. The composite liner of claim 5, wherein the high modulus fibers on the inner surface of the resin absorbent material are joined to the substrate by longitudinal stitching substantially perpendicular to the bundles of fibers.

9. The composite liner of claim 1, wherein the outer layer of high modulus fibers are disposed on and secured to the outside of a porous substrate.

10. The composite liner of claim 9, wherein the high modulus fibers are joined to the porous substrate by longitudinal stitching substantially perpendicular to the bundles of fibers.

11. The composite tubular liner of claim 1, wherein the high modulus fiber is selected from the group consisting of glass, polyester, polypropylene, nylon, carbon, Aramid (aromatic polyamide), steel and mixtures thereof.

12. The composite tubular liner of claim 1, wherein the high modulus fiber is carbon fiber.

13. The composite tubular liner of claim 1, wherein the carbon fibers are disposed in tows containing between about 30,000 to 100,000 individual fibers of between about 200 to 750 feet per pound.

14. The composite tubular liner of claim 1, wherein the high modulus fiber is glass fiber.

15. The composite tubular liner of claim 14, wherein the glass is a type E glass in bundles with strands having a continuous length of about 100 to 1,000 feet per pound.

16. The composite tubular liner of claim 1, wherein the outer layer of high modulus fibers are stitched together substantially perpendicular to the bundles of fibers.

17. The composite tubular liner of claim 1, wherein the high modulus fibers in at least one of the layers of high modulus fibers are joined joined at the edges of the fibers and folded to allow for expansion before the resin is cured.

18. The composite tubular liner of claim 1, wherein the high modulus fibers are disposed circumferentially and substantially parallel to each other.

19. The composite tubular liner of claim 1, wherein the impermeable layer disposed on the outer layer of high modulus fibers includes resin absorbent material on the inner surface forming a bond with resin in the resin absorbent layer after cure.

20. The composite tubular liner of claim 1, wherein at least one of the layers of reinforcing fibers includes a high tensile strength fiber in the axial direction.

* * * * *